US008817975B2

(12) United States Patent
Fujisaki et al.

(10) Patent No.: US 8,817,975 B2
(45) Date of Patent: Aug. 26, 2014

(54) CRYPTOGRAPHIC PROCESSING APPARATUS AND OPERATION METHOD

(75) Inventors: Koichi Fujisaki, Kawasaki (JP); Atsushi Shimbo, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/155,889

(22) Filed: Jun. 8, 2011

(65) Prior Publication Data

US 2011/0268266 A1      Nov. 3, 2011

Related U.S. Application Data

(63) Continuation of application No. PCT/JP2009/070618, filed on Dec. 9, 2009.

(30) Foreign Application Priority Data

Dec. 9, 2008    (JP) .................................. 2008-313556

(51) Int. Cl.
*H04L 9/08*    (2006.01)

(52) U.S. Cl.
USPC ................. 380/28; 380/46; 380/277; 726/36; 713/164; 713/193

(58) Field of Classification Search
CPC ....................................................... H04L 9/003
USPC ........................................................... 380/28
See application file for complete search history.

(56) References Cited

U.S. PATENT DOCUMENTS 7,965,836 B2 *   6/2011   Ahn et al. ....................... 380/28

2003/0048903 A1 *   3/2003   Ito et al. ......................... 380/263
2007/0140478 A1 *   6/2007   Komano et al. .................. 380/28
2008/0260145 A1 *   10/2008   Trichina .......................... 380/46

FOREIGN PATENT DOCUMENTS

| JP | 2005-100085 | 4/2005 |
| JP | 2006-517036 | 7/2006 |
| WO | WO 2008/146482 A1 | 4/2008 |

OTHER PUBLICATIONS

International Search Report and Written Opinion dated Mar. 23, 2010 from PCT/JP2009/070618.

Nikova, et al.; *"Threshold Implementations Against Side-Channel Attacks and Glitches"*, LNCS, 2006. 12, vol. 4307, pp. 529-545, 8th International Conference in Information and Communications Security (ICICS).

(Continued)

*Primary Examiner* — Morshed Mehedi
(74) *Attorney, Agent, or Firm* — Ohlandt, Greeley, Ruggiero & Perle, L.L.P.

(57) ABSTRACT

According to one embodiment, a cryptographic processing apparatus is provided with first to fifth units. The first unit mask-converts input data from first temporary mask into first fixed mask (an invariable value in a first linear operation). In an encryption, the third unit performs a nonlinear operation on the mask-converted data and outputs a first result masked with second fixed mask data (an invariable value in a second linear operation). The fourth unit performs the second linear operation and outputs a encryption result masked with second fixed mask data. In a decryption, the second unit performs the first linear operation on the mask-converted data and outputs a second result masked with the first fixed mask. The third unit performs the nonlinear operation and outputs a decryption result masked with the second fixed mask. In encryption/decryptions, the fifth unit converts the mask of the encryption/decryption results into second temporary mask.

10 Claims, 10 Drawing Sheets

(56) References Cited

OTHER PUBLICATIONS

Morioka, et al., *"DPA Attack to AES S-Box Circuits Over Composite Fields"*; 2004, vol. II of II, Oct. 20, 2004, vol. 2004, No. 11, pp. 569-684 (w/English Abstract).

Morioka, et al., *"A Logic Design Methodology of Low-power AES Cryptographic Circuits"*, May 15, 2003, vol. 44, No. 5, pp. 1321-1328 (w/English Abstract).

Design Wave Magazine, Nov. 2003, pp. 151-158, (w/Statement of Relevancy).

First Japanese Office Action dated Jan. 22, 2013 from corresponding Japanese Patent Application No. 2008-313556; 6 pages.

Motoyama, et al.; "Cryptographic IP for System LSIs"; Toshiba Review, Japan, Kabushiki Kaisha Toshiba; Aug. 1, 2003, vol. 58, No. 8, pp. 43-46.

IPRP (English translation) from corresponding PCT/JP2009/070618 dated Jul. 14, 2011, 6 pages.

* cited by examiner

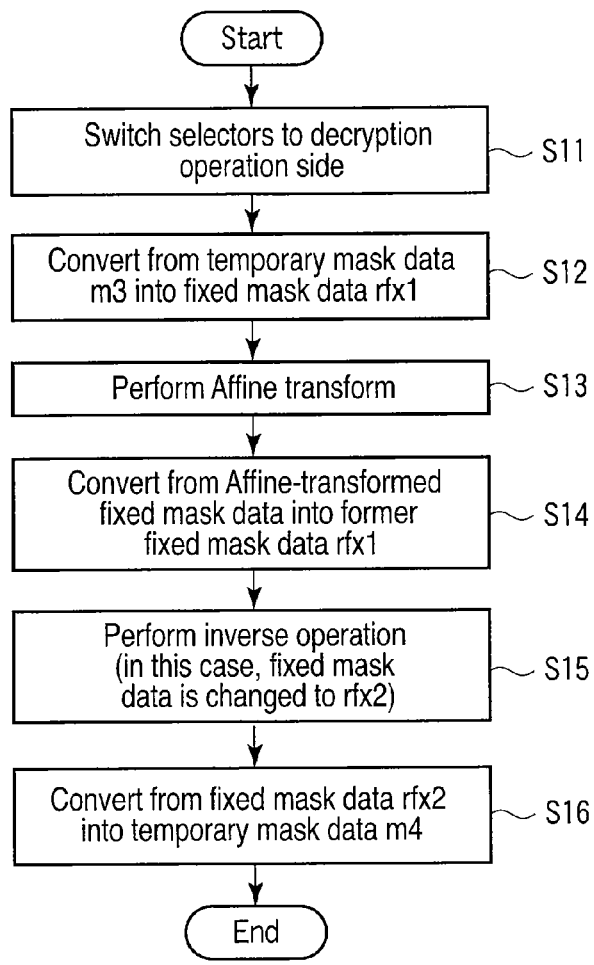
F I G. 3
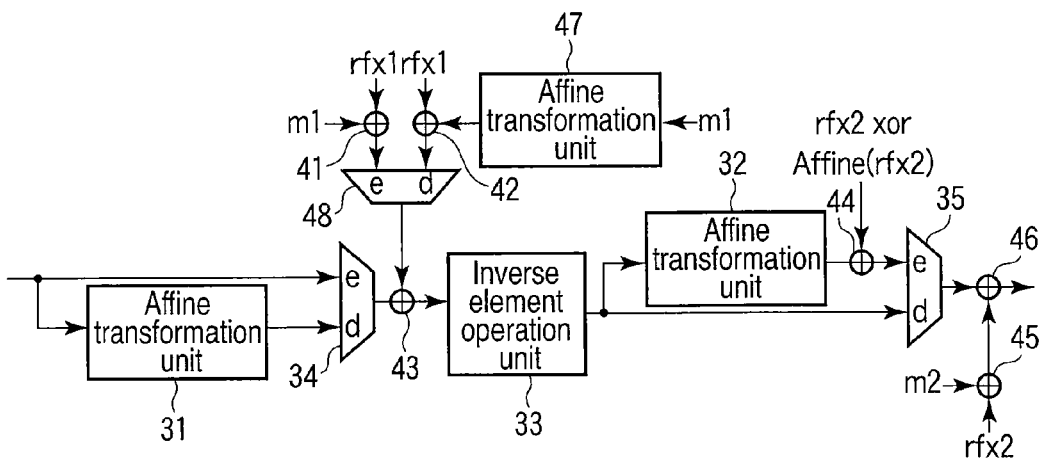
F I G. 4

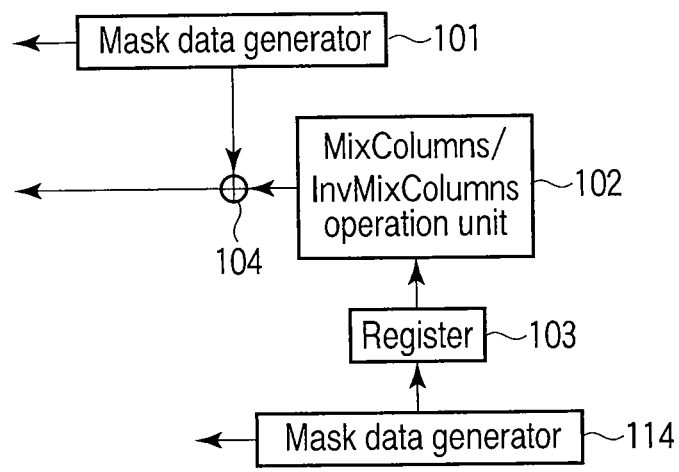
F I G. 9

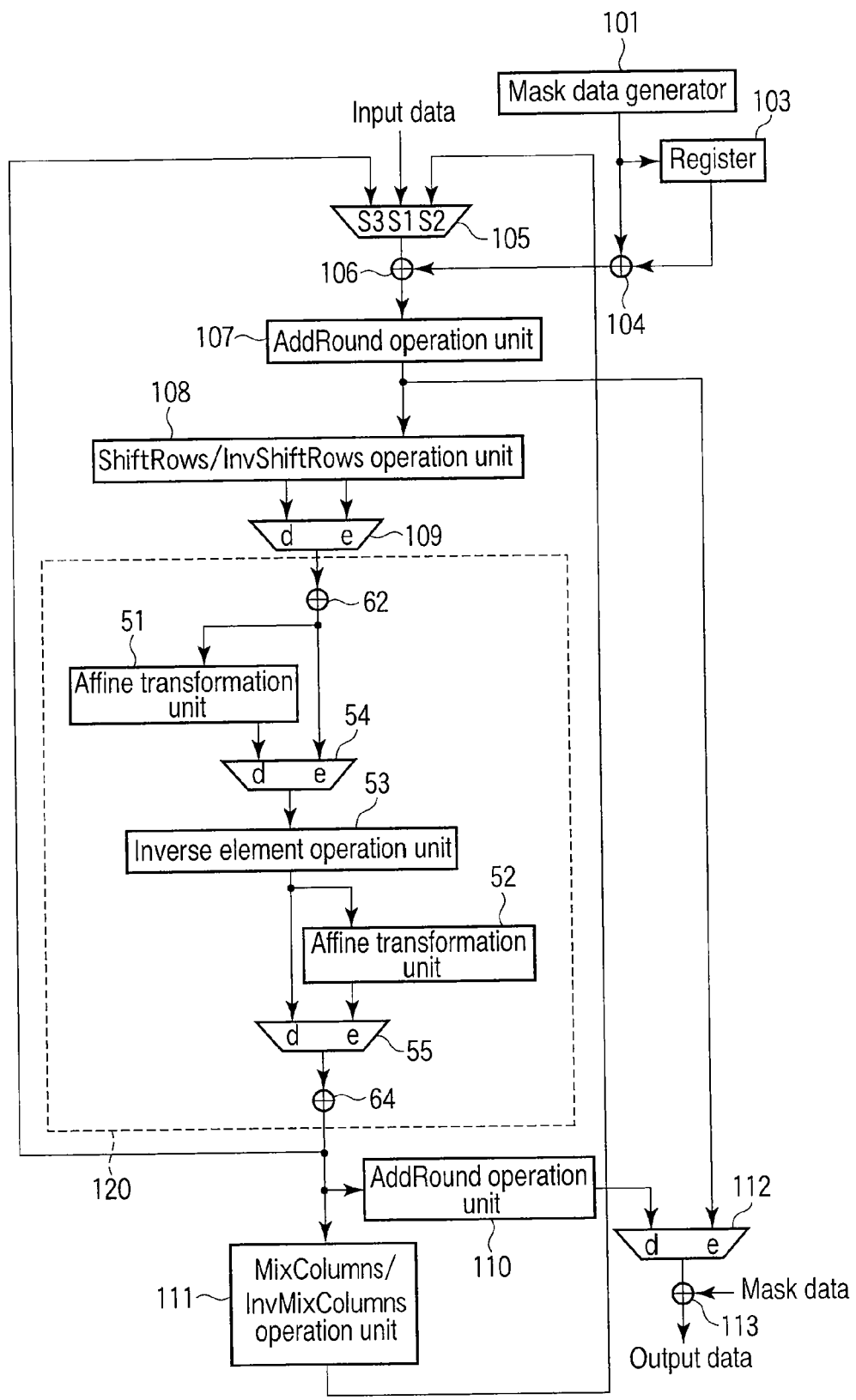
F I G. 10

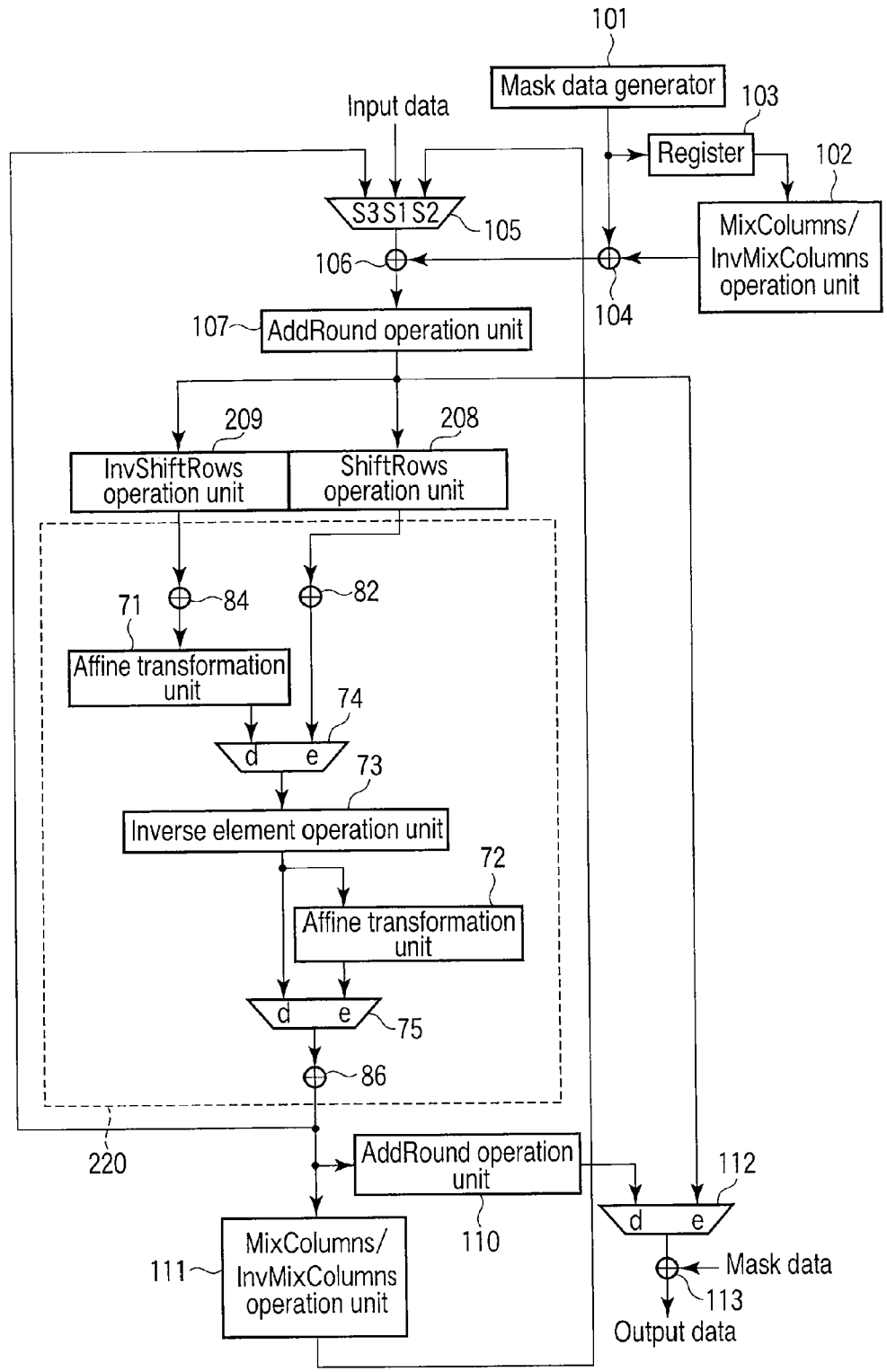
F I G. 13

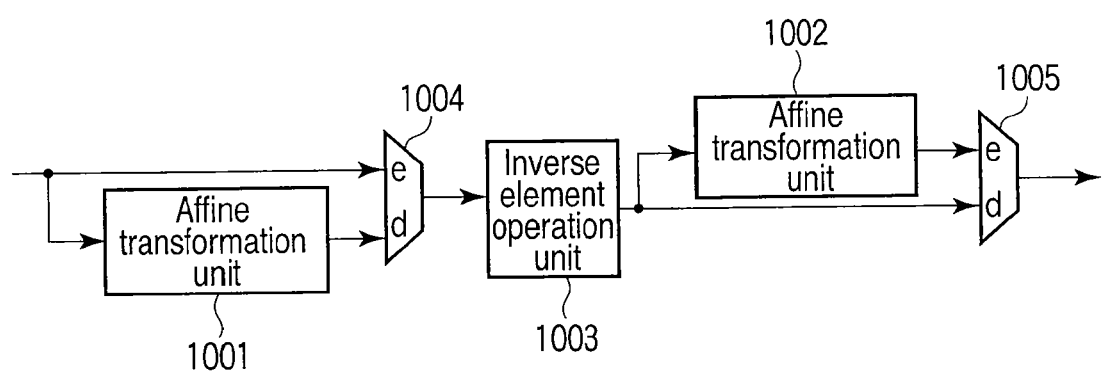
F I G. 14

CRYPTOGRAPHIC PROCESSING APPARATUS AND OPERATION METHOD

CROSS REFERENCE TO RELATED APPLICATIONS

This is a Continuation Application of PCT Application No. PCT/JP2009/070618, filed Dec. 9, 2009, which was published under PCT Article 21(2) in Japanese.

This application is based upon and claims the benefit of priority from Japanese Patent Application No. 2008-313556, filed Dec. 9, 2008; the entire contents of which are incorporated herein by reference.

FIELD

Embodiments described herein relate generally to a cryptographic processing apparatus and an operation method.

BACKGROUND

"Non-invasive attacks" which attack targets without destruction are known as attacking techniques for acquiring secret information stored in attack targets. The "Non-invasive attacks" include a "fault attack" which malfunctions an attack target to acquire data pertaining to secret information from the attack target and a "side channel attack" including Differential Power Analysis (DPA) or Differential Electro-Magnetic Analysis (DEMA) which estimates the secret information of an attack target by measuring the power consumption or leakage electromagnetic waves obtained during execution of encryption and performs statistical analysis between the measurement data and operation data estimated by an attacker.

In a side channel attack, an attacker needs to have an input data value, an output data value, and cryptographic algorithm knowledge of an attack target. This is because data during the operation of the attack target needs to be estimated in the attack procedure of the side channel attack.

More specifically, the attacker estimates the key data and then the data during the operation of the target is obtained from the input data and the cryptographic algorithm information using the estimated key data. A correlation between the estimated operation data and the measured power consumption or leakage electromagnetic waves is calculated. It is then determined whether the correlation between the estimated operation data and the measured power consumption or leakage electromagnetic waves is established. If the correlation is established between them, the secret information has been correctly estimated, and the attack by the attacker is successful.

As described above, for the side channel attack, when it is possible to estimate correctly the data during the operation of the attack target and the estimated operation data has a correlation with the measurement data of the attack target, the attack is successful.

It is therefore effective for a side channel attack to take a countermeasure for disabling an attacker to estimate data during the operation. Paying attention to this countermeasure, there are proposed several countermeasure methods for the side channel attacks. One of them is a data mask method. The data mask method is a method of masking data during the operation by using a value (e.g., a random number) which is unknown to the attacker in order to mask the data during the cryptographic operation of an apparatus as an attack target to a value which cannot be estimated by the attacker. In the countermeasure using the data mask method, since the data during the operation as the attack target is masked using a random number, the attacker cannot correctly estimate the data during the operation unless the attacker knows the mask data value. Even if the attacker measures the power consumption or leakage electromagnetic waves and try to obtain the correlation between the measurement data and the data during the operation estimated by the attacker, the measurement data does not have any correlation with the estimated operation data because the data during the cryptographic operation of the attack target is masked with the random number. Therefore, the attack is unsuccessful.

For example, Tomohisa Wada, "SubBytes Transformation circuit Design Specification for Common Key Cryptography AES", Design Wave Magazine 2003 November, pp. 151-155 (available at www.cqpub.co.jp/dwm/contents/0072/dwm007201511.pdf) (reference[1]) discloses an operation circuit as an a block cipher algorithm AES (Advanced Encryption Standard) operation circuit, the specifications of which are defined in FIPS (Federal Information Processing Standards 197). This circuit integrates a SubBytes operation circuit is used for encryption and an InvSubBytes operation circuit is used for decryption. These circuits are selectively performed the SubBytes operation and the InvSubBytes operation. Therefore this makes it possible to reduce the logic circuit when the circuit is implemented by hardware. In the operation circuit disclosed in reference[1], however, no consideration is made for the side channel attacks.

No consideration has been made for countermeasures for reduction of a logic circuit and countermeasures for side channel attacks in conventional operation circuits including nonlinear operations.

BRIEF DESCRIPTION OF THE DRAWINGS

FIG. 3 is a flowchart showing an example of an operation sequence in decryption of the operation unit according to the embodiment.

FIG. 4 is a diagram showing an arrangement example of the operation unit according to the embodiment.

FIG. 9 is a block diagram showing an arrangement example of the cryptographic operation apparatus according to the embodiment.

FIG. 10 is a block diagram showing still another arrangement example of the cryptographic operation apparatus according to the embodiment.

FIG. 13 is a block diagram showing still another arrangement example of the cryptographic operation apparatus according to the embodiment.

FIG. 14 is a block diagram showing a conventional operation unit.

DETAILED DESCRIPTION

Figure 1:
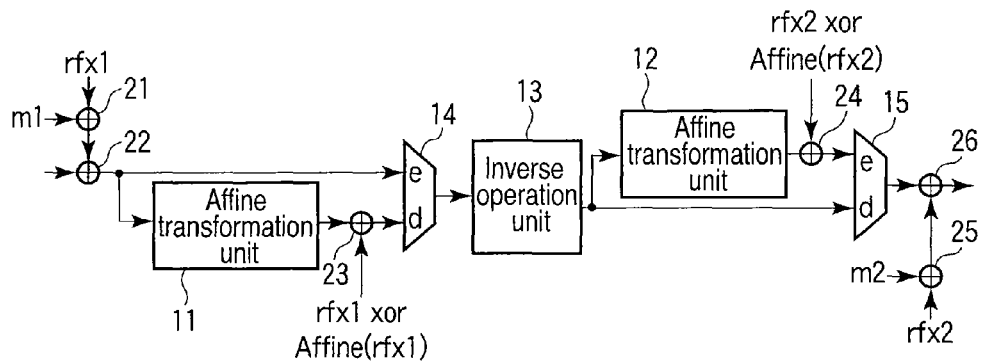
FIG. 1 is a diagram showing an arrangement example of an operation unit according to an embodiment.

Referring to the accompanying drawings, cryptographic processing apparatuses according to the embodiments of the invention will be described in detail. In the embodiments, like reference numbers denote like elements, and no duplicate explanations will be given.

In general, according to one embodiment, there is provided a cryptographic processing apparatus for performing an encryption and a decryption each including a nonlinear operation and a linear operation, the cryptographic processing apparatus comprising a first mask-conversion unit, a first linear operation unit, a nonlinear operation unit, a second linear operation unit and a second mask-conversion unit. The first mask-conversion unit inputs first data obtained by masking an operation target data with first temporary mask data, mask-converts the first data from the first temporary mask data into first fixed mask data as an invariable value in a first linear operation, and outputs second data obtained by masking the operation target data with the first fixed mask data. The first linear operation unit receives the second data, performs the first linear operation on the second data, and outputs third data obtained by masking, with the first fixed mask data, first result data as a result of performing the first linear operation on the operation target data. The nonlinear operation unit, in an encryption, receives the second data, performs a nonlinear operation on the second data, and outputs fourth data obtained by masking, with second fixed mask data as an invariable value in a second linear operation, a result obtained by performing the nonlinear operation on the operation target data, and in a decryption, receives the third data, performs the nonlinear operation on the third data, and outputs fifth data obtained by masking, with the second fixed mask data, second result data as a result of performing the nonlinear operation on the first result data. The second linear operation unit receives the fourth data or the fifth data, performs the second linear operation on the fourth data or the fifth data, and outputs sixth data obtained by masking, with the second fixed mask data, fourth result data as a result of performing the second linear operation on third result data as a result of the nonlinear operation. The second mask-conversion unit, in an encryption, receives the sixth data, mask-converts the sixth data from the second fixed mask data into second temporary mask data, and outputs seventh data obtained by masking the fourth result data with the second temporary mask data, and in a decryption, receives the fifth data, mask-converts the fifth data from the second fixed mask data into the second temporary mask data, and outputs eighth data obtained by masking the second result data with the second temporary mask data.

This embodiment can provide a cryptographic processing apparatus with reducing the logic circuit of an operation circuit including nonlinear operations and taking a countermeasure for side channel attacks.

This embodiment will exemplify AES as a cryptosystem, which is one of block cipher algorithm.

Prior to a description of a cryptographic processing apparatus of this embodiment, a conventional cryptographic processing apparatus will be described below.

The block cipher algorithm AES defines three basic operations used in encryption, i.e., ShiftRows operation, SubBytes operation, and MixColumns operation, three basic operations used in decryption, i.e., InvShiftRows operation, InvSubBytes operation, and InvMixColumns operation, and a basic operation used in encryption and decryptions, i.e., AddRoundKey operation.

Each of the SubBytes operation and InvSubBytes operation is a combination of an inverse operation for obtaining an inverse element on the $2^8$ Galois Field ($GF(2^8)$) and an Affine transform. That is, the SubBytes operation performs the inverse operation on the $GF(2^8)$ and the Affine transform in the order named. The InvSubBytes operation performs the Affine transform and the inverse operation on the $GF(2^8)$ in the order named. Note that the Affine transform is a linear operation, while the inverse operation on the $GF(2^8)$ is a nonlinear operation.

The inverse operation on the $GF(2^8)$ in the SubBytes operation is identical to that in the InvSubBytes operation. For this reason, an operation circuit implemented with one inverse operation unit which performs both the SubBytes and InvSubBytes operations is known (see reference[1]). This makes it possible to reduce the logic circuit in hardware implementation as compared with a case in which the SubBytes and InvSubBytes operations are independently implemented.

FIG. 14 shows a conventional operation unit in which a SubBytes and InvSubBytes operation units used in the cryptographic processing apparatus according to the block cipher algorithm AES are integrated.

Referring to FIG. 14, reference numeral 1001 denotes an Affine transformation unit which performs the Affine transform in decryption; 1002, an Affine transformation unit which performs the Affine transform in encryption; 1003, an inverse operation unit which performs the inverse operation on the $GF(2^8)$ in decryption and encryptions; and 1004 and 1005, selectors which switches between the encryption and the decryption.

In the encryption, both the selectors 1004 and 1005 are connected to the e side. The operations are performed in the order of the inverse operation on the $GF(2^8)$ by the inverse operation unit 1003 and the Affine transform by the Affine transformation unit 1002.

On the other hand, in the decryption, both the selectors 1004 and 1005 are connected to the d side. The operations are performed in the order of the Affine operation by the Affine transformation unit 1001 and the inverse operation on the $GF(2^8)$ by the inverse operation unit 1003.

A problem posed by the conventional cryptographic processing apparatus will be described below.

Assume a data mask method as a countermeasure for side channel attacks.

As previously described, in the data mask method, the data during the operation is masked with the mask data (e.g., a random number). Since the operation is performed with the mask data being attached, the mask data attached to the operation data need to be removed (unmasked) to obtain the final correct operation result.

In order to implement a countermeasure using the data mask method, a circuit arrangement needs to be considered such that the mask data is easily removed after the operation is performed with the data being masked.

An important point is that each operation used in the cryptographic algorithm is linear or nonlinear. A general cryptographic algorithm has a combination of linear and nonlinear operations. A method of implementing the data mask method changes depending on the nature of each operation defined by the cryptographic algorithm.

For example, in the linear operation, only the mask data can easily be removed from the operation result according to the nature of linearity even if the operation is performed with the data being masked.

For example, assume that operation data d is masked with mask data r by exclusive OR operation (xor). In this case, the masked data is represented by d xor r. When the masked data d xor r is input to linear operation F, the nature of linearity yields the following linear operation result:

$$F(d \text{ xor } r) = F(d) \text{ xor } F(r) \quad (1)$$

As for the linear operation, the mask data can easily be removed from its operation result. That is, the mask r undergoes linear operation F to obtain its result F(r). The previously obtained F(d xor r)=F(d) xor F(r) is exclusively ORed with F(r) to obtain the correct operation result F(d):

$$\begin{aligned}(F(d \text{ xor } r)) \text{ xor } F(r) &= (F(d) \text{ xor } F(r)) \text{ xor } F(r) \\ &= F(d) \text{ xor } F(r) \text{ xor } F(r) \\ &= F(d)\end{aligned}$$

As described above, as for the linear operation, the mask data can be removed from the result even if the operation is performed with the input data being masked. This makes it possible to easily obtain the correct operation result supposed to be obtained.

However, in nonlinear operation, equation (1) cannot be established due to the nature of nonlinearity.

When the nonlinear operation is performed while the input data is masked with the mask data, the mask data cannot be removed from the operation result by the above method.

In the operations used in the block cipher algorithm AES, operations other than the SubBytes and InvSubBytes operations are linear operations. As described above, as for the linear operation, the mask data can easily removed from the linear operation result even if the linear operation is performed while the data as the operation target is masked with the mask data.

On the other hand, among the operations used in the block cipher algorithm AES, operations including nonlinear operations are the SubBytes and InvSubBytes operations. As described above, the inverse operations on the $GF(2^8)$ are the nonlinear operations. For this reason, in the operation circuit including the nonlinear operations, as shown in FIG. 14, when the operation is performed with the mask data being attached, any correct operation result cannot be obtained. However, in the operation circuit disclosed in reference[1], no consideration is taken for the countermeasure for the side channel attacks (no countermeasure is implemented for the side channel attacks).

This embodiment employs an arrangement of performing nonlinear operation using a table which performs nonlinear operations corresponding to specific mask data (fixed mask data to be described later) upon generation of the table in advance for nonlinear operations. That is, the nonlinear operations included in the SubBytes and InvSubBytes operations are inverse operations on the $GF(2^8)$. For this reason, a table which performs nonlinear operations corresponding to the specific mask data is generated in advance, and this table is used. Note that the specific mask data is the secret information and therefore can be stored securely.

This embodiment also uses mask data such as a random number in the linear operations unlike the SubBytes and InvSubBytes operations. To implement this, mask-conversion between the mask data such as a random number and the specific mask data is performed before and after the SubBytes and InvSubBytes operations.

The countermeasure for the nonlinear operations allows to implement the countermeasure using the data mask method always using the mask data during the operation so as to finally obtain a desired correct operation result.

The cryptographic processing apparatus according to this embodiment will be described in detail below.

The operation unit integrally including the SubBytes and InvSubBytes operation units used in the cryptographic processing apparatus according to the block cipher algorithm AES is arranged to allow the $GF(2^8)$ inverse operation to use, as the operation target, the data masked with the specific mask data in order to implement the countermeasure for the side channel attack.

The $GF(2^8)$ inverse operation unit corresponding to the specific mask data can be implemented using the table generated in advance. In this case, since the table corresponds to only the specific mask data as an assumption upon its generation, the correct operation result cannot be obtained unless the data input to the $GF(2^8)$ inverse operation is masked with the specific mask data in advance.

Assume the mask data such as a random number is converted into the specific mask data while an increase in the number of gates is suppressed. In this case, an arrangement example for performing mask-conversion before the branch into the encryption and decryption sides will be described below (FIG. 1). Note that an arrangement example for performing mask-conversion just before the inverse operation will then be described (FIG. 4).

FIG. 1 shows an arrangement example of an operation unit in which SubBytes and InvSubBytes operation units implemented with the side channel countermeasure are integrated.

Referring to FIG. 1, reference numeral 11 denotes an Affine transformation unit (first linear operation unit) which performs Affine transform in decryption; 12, an Affine transformation unit (second linear operation unit) which performs Affine transform in encryption; and 13, an inverse operation unit (nonlinear operation unit) which performs inverse operation on $GF(2^8)$ in the decryption and encryptions. Reference numerals 14 and 15 denote selectors (first and second selection units) which switch between the decryption and encryption; and 21 to 26, exclusive OR operation units (XOR operation units) which perform exclusive OR operations (first mask-conversion units 21 and 22, fourth mask-conversion unit 23, fifth mask-conversion unit 24, and second mask-conversion units 25 and 26).

In encryption, both the selectors 14 and 15 are connected to the e side. The operations are performed in the order of the inverse operation on $GF(2^8)$ by the inverse operation unit 13 and the Affine transform by the Affine transformation unit 102.

On the other hand, in the decryption, both the selectors 14 and 15 are connected to the d side. The operations are performed in the order of the Affine transform by the Affine transformation unit 11 and the inverse operation on the $GF(2^8)$ by the inverse operation unit 13.

In the following description, m1 and m2 are mask data (to be referred to temporary mask data hereinafter) such as random numbers whose values may change at an appropriate timing. In this case, m2 is explained as a value independent of m1. However, m2 may be equal to m1. In this case, in the following formulas, m2 is replaced with m1. This point also applies to the respective arrangement examples to be described later.

In the following description, rfx1 and rfx2 are mask data (to be referred to fixed mask data hereinafter) whose values are fixed. In this case, rfx2 is a value independent of rfx1. However, rfx2 may be equal to rfx1. In this case, in the following formulas, rfx2 is replaced with rfx1. This point also applies to the respective arrangement examples to be described later.

Note that when a countermeasure for side channel attacks is to be considered, the number of "0"s in each of the fixed mask data (the above data rfx1 and rfx2) is preferably equal (or almost equal) to the number of "1"s in it. This is because the side channel attack uses the difference in power consumption in the operation based on the difference between the number of "0"s and the number of "1"s in the data being processed. When the difference between the number of "0"s and the number of "1"s in the data masked with the mask data is larger, the data is susceptible to an attack. This point also applies to the temporary mask data (the above data m1 and m2) and further applies to the respective arrangements to be described later.

In the following description, xor represents exclusive OR operation. Affine(x) represents Affine transform. An inverse element X on the $GF(2^8)$ is represented by $X^{-1}$.

Note that the fixed mask data is secret information and therefore can be stored securely.

Figure 2:
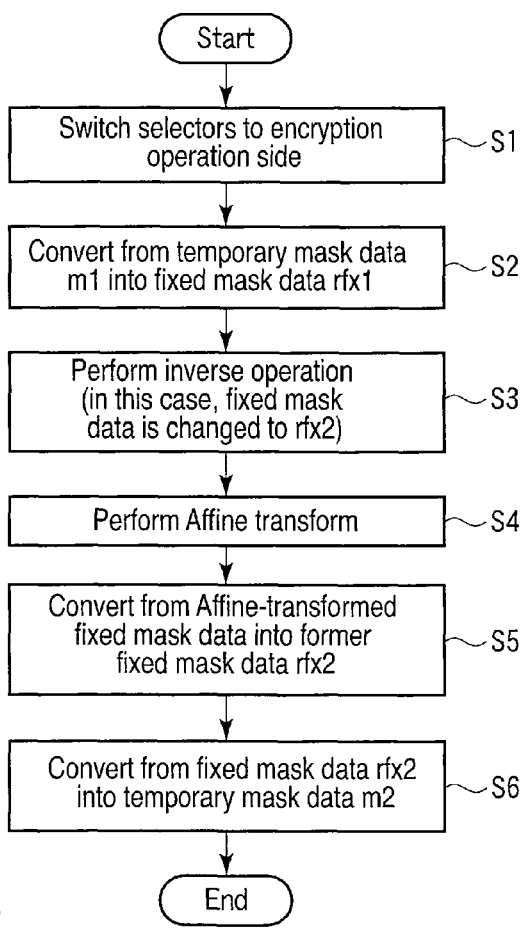
FIG. 2 is a flowchart showing an example of an operation sequence in encryption of the operation unit according to the embodiment.

FIG. 2 shows an example of an operation sequence in encryption of the operation unit in FIG. 1.

First of all, the selectors 14 and 15 are switched to the encryption side (step S1).

The input masked data is mask-converted from the temporary mask data m1 to the fixed mask data rfx1 (step S2).

The inverse operation unit 13 performs the inverse operation for the masked data (step S3). Note that when the masked data is to be mask-converted between the fixed mask data before and after the inverse operation, the masked data mask-converted with the fixed mask data is obtained as the inverse operation result. In this case, the masked data is mask-converted from rfx1 into rfx2.

The Affine transformation unit 12 performs Affine transform (step S4).

The Affine-transformed masked data is mask-converted from the Affine-transformed fixed mask data into the former fixed mask data rfx2 (step S5).

The masked data is mask-converted from the fixed mask data rfx2 into the temporary mask data m2, and the result is output (step S6).

FIG. 3 shows an example of an operation sequence in decryption of the operation unit in FIG. 1.

The selectors 14 and 15 are switched to the decryption side (step S11).

The input masked data is mask-converted from the temporary mask data m3 into the fixed mask data rfx1 (step S12).

The Affine transformation unit 11 performs Affine transform (step S13).

The Affine-transformed masked data is mask-converted from the Affine-transformed fixed mask data into the former fixed mask data rfx1 (step S14).

The inverse operation unit 13 performs the inverse operation for the masked data (step S15). Note that when the masked data is to be mask-converted between the fixed mask data before and after the inverse operation as described above, the masked data mask-converted with the fixed mask data is obtained as the inverse operation result. In this case, the masked data is mask-converted from rfx1 into rfx2.

The masked data output from the inverse operation unit 13 is mask-converted from the fixed mask data rfx2 into the temporary mask data m4, and the result is output (step S16).

The encryption will be described below.

The original data as the SubBytes operation target in the SubBytes/InvSubBytes operation unit in FIG. 1 is represented by d1. An input to the SubBytes/InvSubBytes operation unit in FIG. 1 is a value obtained by masking the data d1 serving as the operation target with the temporary mask data (in this case, the temporary mask data is m1). In this case, the masking operation uses exclusive OR operation. In unmasking operation, the exclusive OR operation is used. Therefore, the input to the SubBytes/InvSubBytes operation unit is the masked data d1 xor m1.

The XOR operation unit 21 inputs the temporary mask data m1 and the fixed mask data (in this case, the fixed mask data is rfx1) and outputs their exclusive OR result m1 xor rfx1.

The XOR operation unit 22 receives the above input d1 xor m1 and the output m1 xor rfx1 of the XOR operation unit 21 and outputs their exclusive OR result (d1 xor m1) xor (m1 xor rfx1)=d1 xor rfx1.

As described above, in the encryption, the output from the XOR operation unit 22 is supplied to the inverse operation unit 13 via the selector 14.

In this case, the inverse operation unit 13 can be implemented by the table generated in advance in correspondence with the fixed mask data rfx1. That is, when the data masked with the fixed mask data rfx1 is input to the inverse operation unit 13, the inverse operation unit 13 outputs the correct operation result.

The inverse operation unit 13 corresponding to the fixed mask data rfx1 receives the output d1 xor rfx1 of the XOR operation unit 22 and outputs their operation result of the inverse element on the $GF(2^8)$. Note that this operation result is not the original inverse element $d1^{-1}$, but $d1^{-1}$ xor rfx2 obtained by masking the original inverse element $d1^{-1}$ with the fixed mask data rfx2.

Note that although the fixed mask data obtained upon the inverse operation is given as rfx2, but may be rfx2=rfx1 as described above.

The Affine transformation unit 12 receives the output $d1^{-1}$ x or rfx2 of the inverse operation unit 13 and outputs their Affine transform result Affine($d1^{-1}$ xor rfx2)=Affine ($d1^{-1}$) x or Affine(rfx2).

Note that this operation uses the nature of linearity described with reference to equation (1) (this also applies to the following description).

The XOR operation unit 24 receives the output Affine ($d1^{-1}$)x or Affine(rfx2) of the Affine transformation unit 12 and the exclusive OR result rfx2 xor Affine(rfx2) of the fixed mask data and the Affine transform result of the fixed mask data and outputs their exclusive OR result (Affine($d1^{-1}$) xor Affine(rfx2)) xor (rfx2 xor Affine(rfx2))=Affine($d1^{-1}$) xor rfx2. Note that rfx2 xor Affine(rfx2) can be calculated in advance.

As described above, in encryption, the output from the XOR operation unit 24 is supplied to the XOR operation unit 26 via the selector 15.

The XOR operation unit 25 inputs the fixed mask data rfx2 and the temporary mask data (in this case, the temporary mask data is m2) and outputs their exclusive OR result rfx2 xor m2.

The XOR operation unit 26 receives the output Affine ($d1^{-1}$) xor rfx2 of the XOR operation unit 24 and the output rfx2 xor m2 of the XOR operation unit 25 and outputs their exclusive OR result (Affine($d1^{-1}$) xor rfx2) xor (rfx2 xor m2)=Affine($d1^{-1}$) xor m2. That is, this output Affine($d1^{-1}$) x or m2 is the output from the SubBytes/InvSubBytes operation unit in FIG. 1. That is, the result obtained such that the SubBytes operation result of the original data d1 serving as the operation target is masked with the temporary mask data m2 is obtained.

Note that m2=m1 may be used as described above.

The decryption will now be described below.

The original data serving as the target of the InvSubBytes operation in the SubBytes/InvSubBytes operation unit in FIG. 1 is represented by d2. An input to the SubBytes/InvSubBytes operation unit in FIG. 1 is a value obtained by masking the data d2 serving as the operation target with the temporary mask data (in this case, the temporary mask data is m3). In this example, the input to the SubBytes/InvSubBytes operation unit in FIG. 1 is the masked data d2 xor m3.

The XOR operation unit 21 inputs the temporary mask data m3 and the fixed mask data rfx1 and outputs their exclusive OR result m3 xor rfx1.

The XOR operation unit 22 receives the above input d2 xor m3 and the output m3 xor rfx1 of the XOR operation unit 21 and outputs their exclusive OR result (d2 xor m3) xor (m3 xor rfx1)=d2 xor rfx1.

The Affine transformation unit 11 receives the output d2 xor rfx1 of the XOR operation unit 22 and outputs their Affine transform result Affine(d2 xor rfx1)=Affine(d2) xor Affine (rfx1).

The XOR operation unit 23 receives the output Affine(d2) xor Affine(rfx1) of the Affine transformation unit 11 and the exclusive OR result rfx1 xor Affine(rfx1) of the fixed mask data and the Affine transform result of the fixed mask data and outputs their exclusive OR result (Affine(d2) xor Affine (rfx1)) xor (rfx1 xor Affine(rfx1))=Affine(d2) xor rfx1. Note that rfx1 xor Affine(rfx1) can be calculated in advance.

As described above, in decryption, the output from the XOR operation unit 23 is supplied to the inverse operation unit 13 via the selector 14.

The inverse operation unit 13 corresponding to the fixed mask data rfx1 receives the output Affine(d2) xor rfx1 of the XOR operation unit 23 and outputs their operation result of the inverse element on the $GF(2^8)$. Note that this operation result is not the original inverse element $Affine(d2)^{-1}$, but $(Affine(d2))^{-1}$ xor refx2 obtained by masking the original inverse element $Affine(d2)^{-1}$ with the fixed mask data rfx2.

As described above, in decryption, the output from the inverse operation unit 13 is supplied to the XOR operation unit 26 via the selector 15.

The XOR operation unit 25 inputs the fixed mask data rfx2 and the temporary mask data (in this case, the temporary mask data is m4) and outputs their exclusive OR result rfx2 xor m4.

The XOR operation unit 26 receives the output $(Affine(d2))^{-1}$ xor rfx2 of the inverse operation unit 13 and the output rfx2 xor m4 of the XOR operation unit 25 and outputs their exclusive OR result $((Affine(d2))^{-1}$ xor rfx2) xor (rfx2 xor m4)=$(Affine(d2))^{-1}$ xor m4. That is, this output $(Affine(d2))^{-1}$ xor m4 is the output from the SubBytes/InvSubBytes operation unit in FIG. 1. That is, the result obtained such that the InvSubBytes operation result of the original data d2 serving as the operation target is masked with the temporary mask data m4 is obtained.

Note that m4=m3 may be used as described above.

An arrangement example of performing mask-conversion after the first selector will be described below.

FIG. 4 shows another arrangement example of the operation unit in which the SubBytes and InvSubBytes operation units implemented with the side channel countermeasure are integrated. Note that points different from the arrangement example of FIG. 1 will be mainly described.

Referring to FIG. 4, reference numeral 31 denotes an Affine transformation unit which performs Affine transform in decryption (the same Affine transform as in the Affine transformation unit 11 in FIG. 1); 32, an Affine transformation unit which performs Affine transform in encryption (the same Affine transform as in the Affine transformation unit 12 in FIG. 1); and 33, an inverse operation unit which performs the inverse operation on $GF(2^8)$ in both the decryption and encryptions. Reference numerals 34 and 35 denote selectors which switch between the decryption and encryptions; and 41 to 46, XOR operation units which perform exclusive OR operations. Reference numeral 47 denotes an Affine transformation unit used in mask data operation (the same Affine transform as in the Affine transformation unit 31) in the decryption; and 48, a selector which switches between the mask data in the decryption and encryptions.

In encryption, all the selectors 14, 15, and 48 are connected to the e side. In decryption, all the selectors 14, 15, and 48 are connected to the d side.

First of all, encryption will be described below.

The SubBytes/InvSubBytes operation unit in FIG. 4 receives d1 xor m1 as in the example of FIG. 1.

The XOR operation unit 41 outputs m1 xor rfx1 as in the XOR operation unit 21 in FIG. 1.

The XOR operation unit 43 outputs d1 xor rfx1 as in the XOR operation unit in FIG. 1 to the inverse operation unit 13.

The subsequent operations are the same as in the example of FIG. 1. Finally, the result, i.e., $Affine(d1^{-1})$ xor m2 is obtained as the output of the SubBytes/InvSubBytes operation unit in FIG. 4 such that the SubBytes operation result of the original data d1 serving as the operation target is masked with the temporary mask data m2.

The decryption will then be described below.

The SubBytes/InvSubBytes operation unit in FIG. 4 inputs d2 xor m3 as in the case of FIG. 1.

The Affine transformation unit 31 receives the above input d2 xor m3 and outputs its Affine transform result Affine(d2 xor m3)=Affine(d2) xor Affine(m3).

On the other hand, the Affine transformation unit 47 inputs the temporary mask data m3 and outputs its Affine transform result Affine(m3). The XOR operation unit 42 receives the Affine transform result Affine(m3) and the fixed mask data rfx1 and outputs their exclusive OR result Affine(m3) xor rfx1.

The XOR operation unit 43 receives the output Affine(d2) xor Affine(m3) of the Affine transformation unit 31 and the output Affine(m3) xor rfx1 of the XOR operation unit 42 and outputs their exclusive OR result (Affine(d2) xor Affine(m3)) xor (Affine(m3) xor rfx1)=Affine(d2) xor rfx1 to the inverse operation unit 13.

The subsequent operations are the same as in the example of FIG. 1. Finally, the result, i.e., $(Affine(d2))^{-1}$ xor m4 is obtained as the output of the SubBytes/InvSubBytes operation unit in FIG. 4 such that the InvSubBytes operation result of the original data d2 serving as the operation target is masked with the temporary mask data m4.

An arrangement example in which the number of elements is reduced as compared with FIGS. 1 and 4 will be described by reducing the number of times of mask-conversion. Note that the points different from the arrangement in FIG. 1 will be mainly described.

When mask-conversion into the fixed mask data is performed before the Affine transformation unit 11, as in FIG. 1, the fixed mask data is Affine-transformed in decryption. When mask-conversion into the fixed mask data is performed in the output from the selector 34 as in FIG. 4, the temporary mask data is Affine-transformed in decryption. In either case, in the decryption, the Affine-transformed fixed mask data or the Affine-transformed temporary mask data needs to be converted into the fixed mask data. In case of FIG. 4, the Affine transformation unit 47 is required to Affine-transform the temporary mask data in addition to the Affine transformation unit 31.

In the encryption, similarly, since the Affine transformation units 12 and 32 Affine-transform the fixed mask data, mask-conversion from the Affine-transformed fixed mask data into the fixed mask data needs to be performed.

In this embodiment, values invariable for Affine transform are employed as two fixed mask data in FIG. 1 or the temporary mask data and fixed mask data in FIG. 4. When the mask data are invariable for Affine transform, the exclusive OR units (and an Affine transformation unit, in FIG. 4) for mask-conversion can be omitted. By omitting these units, the maximum delay time can be shortened, and the circuit processing capability can improve.

Note that since the Affine transform is determined by the cryptographic algorithm specifications, it is possible to find values invariable for the Affine transform in advance.

When the masked data (exclusive OR result of data d and mask r) d xor r is input to the Affine transform Affine, equation (2) is established due to the nature of linearity of the Affine transform.

$$\text{Affine}(d\,\text{xor}\,r) = \text{Affine}(d)\,\text{xor}\,\text{Affine}(r) \quad (2)$$

wherein the mask r satisfies equation (3):

$$r = \text{Affine}(r) \quad (3)$$

Equation (3) allows to rewrite equation (2) into equation (4).

$$\text{Affine}(d\,\text{xor}\,r) = \text{Affine}(d)\,\text{xor}\,\text{Affine}(r) = \text{Affine}(d)\,\text{xor}\,r \quad (4)$$

The result obtained by Affine-transforming the masked data d xor r becomes the value Affine(d) xor r obtained by masking the Affine transform result of data d with mask r. This is the value to be calculated. Therefore, no mask-conversion circuit is required after Affine transform.

An arrangement example using the mask data satisfying equation (3) will be described below.

Figure 5:
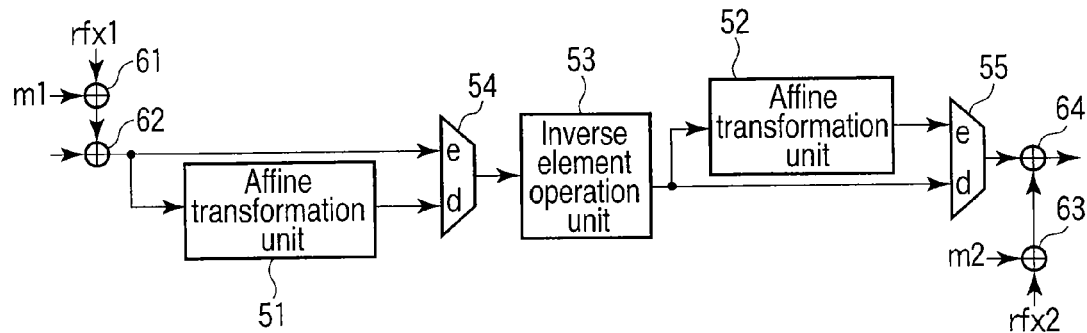
FIG. 5 is a diagram showing another arrangement example of the operation unit according to the embodiment.

FIG. 5 shows still another arrangement example of the operation unit in which the SubBytes operation unit and the InvSubBytes operation unit implemented with the side channel countermeasure are integrated.

Referring to FIG. 5, reference numeral 51 denotes an Affine transformation unit (first linear operation unit) which performs the Affine transform in decryption (the same Affine transform as in the Affine transformation unit 11 in FIG. 1); 52, an Affine transformation unit (second linear operation unit) which performs Affine transform in encryption (the same Affine transform as in the Affine transformation unit 12 in FIG. 1); and 53, an inverse operation unit (nonlinear operation unit) which performs inverse operation on $GF(2^8)$ in both the decryption and encryptions. Reference numerals 54 and 55 denote selectors (first and second selection units) which switch between the decryption and encryptions; and 61 to 64, XOR operation units which perform exclusive OR operations (first mask-conversion units 61 and 62 and second mask-conversion units 63 and 64).

Note that in the encryption, both the selectors 54 and 55 are connected to the e side, while in the decryption, both the selectors 14 and 15 are connected to the d side as in FIG. 1.

The number of "0"s in the temporary mask data or fixed mask data is preferably equal (or almost equal) to the number of "1"s in it, as in FIG. 1.

When viewing the arrangement example in FIG. 1, the XOR operation unit 23 exclusively ORs the output from the Affine transformation unit 11 and the exclusive OR result rfx1 xor Affine(rfx1) of the fixed mask data and the Affine transform result of the fixed mask data. In the output of the Affine transformation unit 11, mask-converting operation which converts Affine(rfx1) attached to Affine(d2) into rfx1 is performed.

Assume that as rfx1 a value invariable for Affine transform (Affine transforms in the Affine transformation units 11 and 51), i.e., rfx1=Affine(rfx1) is employed. In this case, the output from the Affine transformation unit 11 becomes Affine(d2) xor Affine(rfx1)=Affine(d2) xor rfx1. In other words, if rfx1=Affine(rfx1), then rfx1 xor Affine(rfx1)=0. The XOR operation unit 23 which receives this value "0" as one input outputs the other input directly. This indicates that the mask-converting operation is not required before the $GF(2^8)$ inverse operation. That is, the XOR operation unit 23 in FIG. 1 is unnecessary.

In the arrangement example of FIG. 5, the value invariable for the Affine transform (the Affine transforms in the Affine transformation units 12 and 52), i.e., a value satisfying rfx1=Affine(rfx1) is always employed as the fixed mask data rfx1, thereby omitting the XOR operation unit 23 from the arrangement example in FIG. 1.

Similarly, the XOR operation unit 24 is omitted from the arrangement example in FIG. 1 by always employing a value as the fixed mask data rfx2 which satisfies rfx2=Affine(rfx2).

Figure 6:
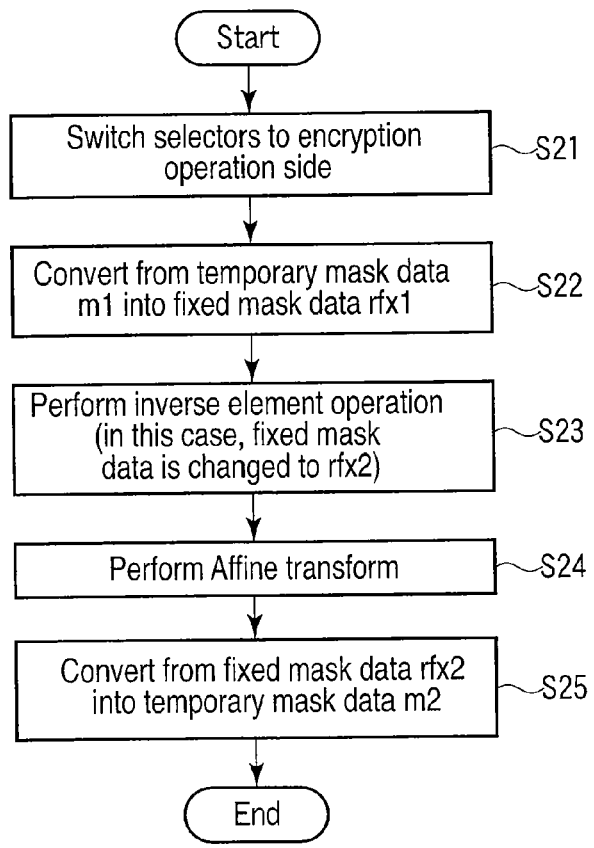
FIG. 6 is a flowchart showing another example of the operation sequence in encryption of the operation unit according to the embodiment.

FIG. 6 shows an example of an operation sequence in encryption of the operation unit in FIG. 5.

First of all, the selectors 54 and 55 are switched to the encryption side (step S21).

The input masked data is mask-converted from the temporary mask data m1 into the fixed mask data rfx1 (step S22).

The inverse operation unit 53 performs the inverse operation for the masked data (step S23). Note that when the masked data is to be mask-converted between the fixed mask data before and after the inverse operation, the masked data mask-converted with the fixed mask data is obtained as the inverse operation result. In this case, the masked data is mask-converted from rfx1 into rfx2.

The Affine transformation unit 52 performs Affine transform (step S24). Since the fixed mask data is invariable upon the Affine transform, mask-converting the data with the fixed mask data need not be performed.

The masked data output from the Affine transformation unit 52 is mask-converted from the fixed mask data rfx2 into the temporary mask data m2. The data masked with the temporary mask data m2 is output (step S25).

Figure 7:
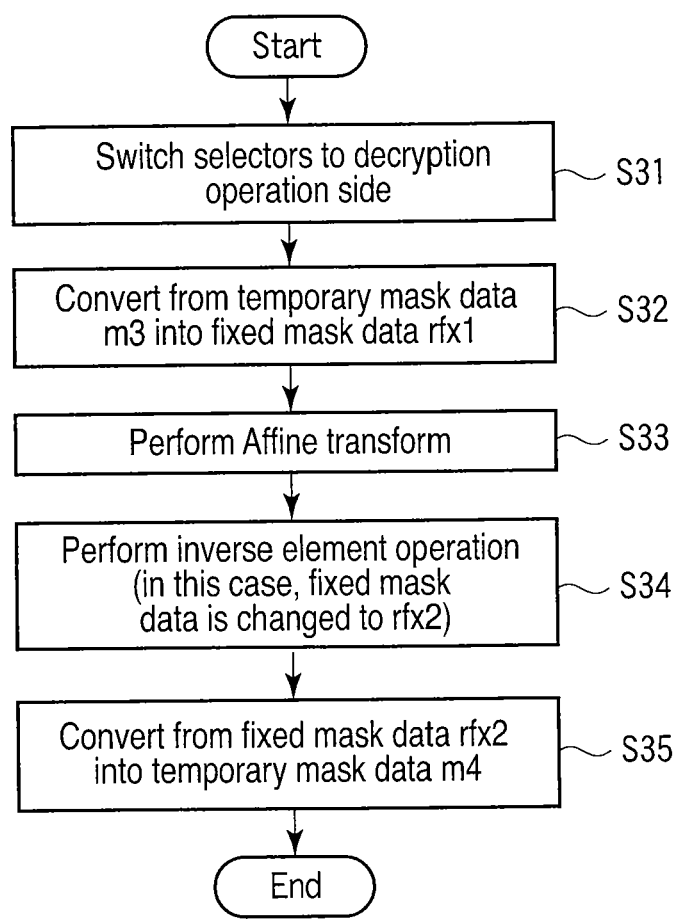
FIG. 7 is a flowchart showing another example of the operation sequence in decryption of the operation unit according to the embodiment.

FIG. 7 shows an example of an operation sequence in decryption of the operation unit in FIG. 5.

First of all, the selectors 54 and 55 are switched to the decryption side (step S31).

The input masked data is mask-converted from the temporary mask data m3 into the fixed mask data rfx1 (step S32).

The Affine transformation unit 51 performs Affine transform (step S33).

Note that since the fixed mask data is invariable upon the Affine transform, mask-converting the data with the fixed mask data need not be performed.

The inverse operation unit 53 performs the inverse operation for the masked data (step S34). Note that when the masked data is mask-converted between the fixed mask data before and after the inverse operation as described above, the masked data mask-converted with the fixed mask data is obtained as the inverse operation result. In this case, the masked data is mask-converted from rfx1 into rfx2.

The masked data output from the inverse operation unit 53 is mask-converted from the fixed mask data rfx2 into the temporary mask data m4. The data masked with the temporary mask data m4 is output (step S35).

The encryption will be described below.

Assume that an input to the SubBytes/InvSubBytes operation unit in FIG. 5 is d1 xor m1.

The XOR operation unit 61 inputs the above temporary mask data m1 and the fixed mask data rfx1 and outputs their exclusive OR result m1 xor rfx1.

The XOR operation unit 62 receives the above input d1 xor m1 and the output m1 xor rfx1 of the XOR operation unit 61 and outputs their exclusive OR result (d1 xor m1) xor (m1 xor rfx1)=d1 xor rfx1.

In the encryption, the XOR operation unit 62 supplies the output to the inverse operation unit 13 via the selector 54.

The inverse operation unit 53 receives the output d1 xor rfx1 of the XOR operation unit 62 and outputs the inverse operation result $d1^{-1}$ xor rfx2.

Note that although the fixed mask data having undergone the inverse operation is given as rfx2, but rfx2=rfx1 may be given as described above.

The Affine transformation unit 52 receives the output $d1^{-1}$ x or rfx2 of the inverse operation unit 53 and outputs its Affine transform result Affine($d1^{-1}$ xor rfx2)=Affine($d1^{-1}$) xor Affine(rfx2).

Affine(rfx2)=rfx2 yields Affine($d1^{-1}$) xor Affine(rfx2)=Affine($d1^{-1}$) xor rfx2.

In the encryption, the inverse operation unit 53 supplies the output to the XOR operation unit 64 via the selector 55.

The XOR operation unit 63 receives the fixed mask data rfx2 and the temporary mask data m2 and outputs their exclusive OR result rfx2 xor m2.

The XOR operation unit 64 receives the output Affine($d1^{-1}$) xor rfx2 of the XOR operation unit 63 and the output rfx2 xor m2 of the XOR operation unit 25 and outputs their exclusive OR result (Affine($d1^{-1}$) xor rfx2) xor (rfx2 xor m2)=Affine($d1^{-1}$) xor m2. That is, this output Affine($d1^{-1}$) x or m2 is the output from the SubBytes/InvSubBytes operation unit in FIG. 5. That is, the result obtained such that the SubBytes operation result of the original data d1 serving as the operation target is masked with the temporary mask data m2 is obtained.

Note that m2=m1 may be used as described above.

The decryption will now be described below.

Assume that an input to the SubBytes/InvSubBytes operation unit in FIG. 5 is d2 xor m3.

The XOR operation unit 61 inputs the above temporary mask data m3 and the fixed mask data rfx1 and outputs their exclusive OR result m3 xor rfx1.

The XOR operation unit 62 receives the above input d2 xor m3 and the output m3 xor rfx1 of the XOR operation unit 22 and outputs their exclusive OR result (d2 xor m3) xor (m3 xor rfx1)=d2 xor rfx1.

The Affine transformation unit 51 receives the output d2 xor rfx1 of the XOR operation unit 62 and outputs its Affine transform result Affine(d2 xor rfx1)=Affine(d2) xor Affine (rfx1).

Affine(rfx1)=rfx1 yields Affine(d2) xor Affine(rfx1)=Affine(d2) xor rfx1.

In the decryption, the Affine transformation unit 51 supplies the output to the inverse operation unit 53 via the selector 54.

The inverse operation unit 53 receives the output Affine (d2) xor rfx1 of the Affine transformation unit 51 and outputs the inverse operation result $(\text{Affine}(d2))^{-1}$ xor rfx2.

Note that the fixed mask data having undergone the inverse operation is given as rfx2, but rfx2=rfx1 may be given as described above.

In the decryption, the inverse operation unit 53 supplies the output to the XOR operation unit 64 via the selector 55.

The XOR operation unit 63 receives the fixed mask data rfx2 and the temporary mask data (in this case, the temporary mask data is m4) and outputs their exclusive OR result rfx2 xor m4.

The XOR operation unit 64 receives the output (Affine $(d2))^{-1}$ xor rfx2 of the inverse operation unit 53 and the output rfx2 xor m4 of the XOR operation unit 63 and outputs their exclusive OR result $((\text{Affine}(d2))^{-1}$ xor rfx2) xor (rfx2 xor m4)=$(\text{Affine}(d2))^{-1}$ xor m4. That is, this output (Affine $(d2))^{-1}$ xor m4 is the output from the SubBytes/InvSubBytes operation unit in FIG. 5. That is, the result obtained such that the InvSubBytes operation result of the original data d2 serving as the operation target is masked with the temporary mask data m4 is obtained.

Note that m4=m3 may be used as described above.

As shown in FIG. 5, by using a value invariable for the Affine transform as the fixed mask data, the number of gates can be reduced, and the maximum delay time can be shortened.

Note that both the first fixed mask data and the second fixed mask data in FIG. 5 are invariable to the Affine transform, but one of them may be invariable to the Affine transform. In this case, the same arrangement as in the XOR operation unit 23 or 24 in FIG. 1 is given for the mask set not to be invariable.

A cryptographic operation apparatus according to the embodiment will be described next.

Figure 8:
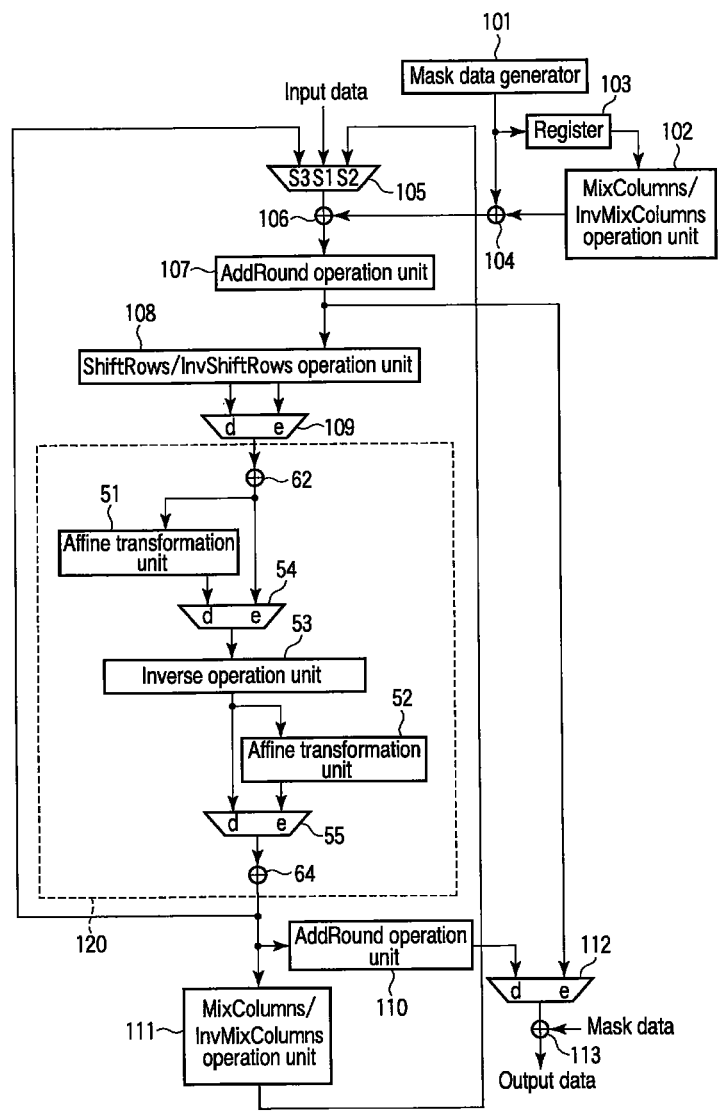
FIG. 8 is a block diagram showing an arrangement example of a cryptographic operation apparatus according to the embodiment.

FIG. 8 shows the arrangement example of the cryptographic operation apparatus according to the embodiment.

Referring to FIG. 8, a part 120 indicates a SubBytes/InvSubBytes operation unit in which the SubBytes operation unit and the InvSubBytes operation unit according to the embodiment shown in FIG. 5 are integrated and the data mask method is implemented. The XOR operation units 61 and 63 are not shown in FIG. 8.

More specifically, the cryptographic operation apparatus shown in FIG. 8 is arranged such that the SubBytes/InvSubBytes operation unit 120 according to the embodiment shown in FIG. 5 is applied to the part including the SubBytes operation unit and the InvSubBytes operation unit in a general cryptographic operation apparatus complying with the block cipher algorithm AES. The cryptographic operation apparatus shown in FIG. 8 may be basically the same as the conventional apparatus except the SubBytes/InvSubBytes operation unit 120.

Referring to FIG. 8, reference numeral 101 denotes a mask data generator which generates temporary mask data for masking data during the operation; 102, a MixColumns/InvMixColumns operation unit which performs AES MixColumns and InvMixColumns operations; 103, a register which holds the value of the immediately preceding mask data; 104, an exclusive OR operation unit; 105, a selector; 106, an exclusive OR operation unit; 107, an AddRoundKey operation unit which performs AES AddRoundKey operation; 108, a ShiftRows/InvShiftRows operation unit which performs AES ShiftRows and InvShiftRows operations; 109, a selector; 110, an AddRoundKey operation unit; 111, a MixColumns/InvMixColumns operation unit; 112, a selector; and 113, an exclusive OR operation unit.

All the selectors 109, 54, 55, and 112 are connected to the e side in the encryption and to the d side in the decryption.

In the first round, the selector 105 is connected to the s1 side. From the second round, the selector 105 is connected to the s2 side. In the last round, the selector 105 is connected to the s3 side.

The mask data generator 101 generates temporary mask data, for example, every round.

The initial value of the register 103 is "0".

The arrangement example in FIG. 8 is based on m2=m1 in FIG. 5. In order to set m2 and m1 independently of each other, part of the arrangement in FIG. 8 is modified, for example, as shown in FIG. 9. Referring to FIG. 9, the first mask data generator 101 is used to generate m1, while the second mask data generator 114 is used to generate m2. The register 103 is connected to the second mask data generator 114. The exclusive OR operation unit 113 is connected to the second mask data generator 114.

An arrangement example having a smaller number of elements than that in FIG. 8 or 9 will be described below. Note that points different from the arrangement example in FIG. 8 or 9 will be mainly explained.

Consider the influences on mask data by the respective AES operations. Other operations by which mask values are changed as in the Affine transform in FIG. 5 are the MixColumns and InvMixColumns operations. This is because mask data in the AddRoundKey operation does not change because this operation is an exclusive OR operation with an extended key data. The ShiftRows operation changes the order of byte data and therefore changes the order of the mask data. To change the order of the data is to change the wiring order in circuit implementation. No special circuit is required to obtain the value having undergone the ShiftRows operation. This operation does not influence the mask data.

To the contrary, the MixColumns and InvMixColumns operations perform operations every 4 bytes in the data of the operation target, thereby changing the mask data values. However, assuming 4-byte mask data having the same value, such mask data is changed by neither the MixColumns operation nor the InvMixColumns operation.

More specifically, the MixColumns operation performs the operation for the operation target data every four bytes according to equation (5):

$$\text{MixColumns}(d0,d1,d2,d3)=\{02\}\cdot d0 \text{xor} \{03\}\cdot d1 \text{xor} d2 \text{xor} d3 \quad (5)$$

where · is the Galois Field multiplication. If d0, d1, d2, and d3 have the same value ds, the MixColumns operation is performed by equation (6). In this case, the division of {03}·ds into {02}·ds xor ds is utilized.

$$\begin{aligned}\text{MixColumns}(ds, ds, ds, ds) &= \{02\}\cdot ds \text{xor} \{03\}\cdot ds \text{xords} \text{xords} \quad (6)\\ &= \{02\}\cdot ds \text{xor}(\{02\}\cdot\\ &\quad ds \text{xords})\text{xords}\text{xords}\\ &= ds\end{aligned}$$

If the 4-byte data have the same value as described above, the InvMixColumns operation yields the operation result ds.

Always using the mask data (temporary mask data) invariable in the MixColumns/InvMixColumns operation allows to omit the MixColumns/InvMixColumns operation unit 102 from the arrangement in FIG. 8 or 9.

Figure 11:
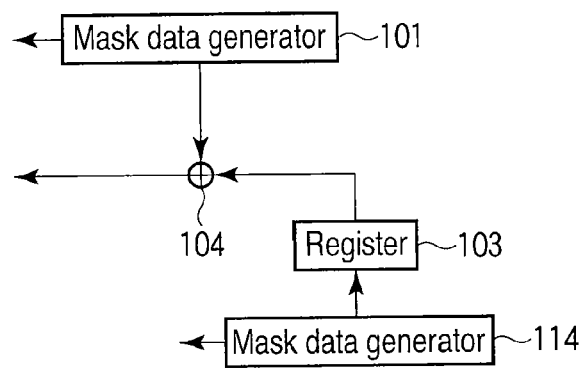
FIG. 11 is a block diagram showing still another arrangement example of the cryptographic operation apparatus according to the embodiment.

FIG. 10 shows an arrangement example of a cryptographic operation apparatus in which the MixColumns/InvMixColumns operation unit 102 is omitted from the arrangement in FIG. 8. FIG. 11 shows an arrangement example in which the MixColumns/InvMixColumns operation unit 102 is omitted from the part in FIG. 9.

The arrangement example in FIG. 10 will be described below.

The exclusive OR operation unit 106 masks the operation target data with the temporary mask data generated by the mask data generator 101. Thereafter, the temporary mask data is invariable in the AddRoundKey operation unit 107 and the ShiftRows/InvShiftRows operation unit 108. The SubBytes/InvSubBytes operation unit 120 mask-converts the operation target data from the temporary mask data into the fixed mask data and performs the ShiftRows/InvShiftRows operation, and then mask-converts from the fixed mask data into the temporary mask data, as previously described. The operation target data with the temporary data is output. The temporary mask data is not influenced. The temporary mask data is invariable in the MixColumns/InvMixColumns operation unit 111 and the AddRoundKey operation unit 107. As can be obvious from the above description, the arrangement in FIG. 10 can provide the correct operation result. This also applies to the arrangement in FIG. 11.

As described above, using the same mask data every four bytes allows to implement the circuit arrangement in which the mask data MixColumns/InvMixColumns operation unit can be omitted.

An arrangement example slightly modified from the above arrangement examples will be described below.

When a high processing capability is required for a cryptographic operation apparatus, the maximum delay time is desirably minimum. That is, the number of elements and circuits arranged on the critical path which defines the maximum delay time has to be small. For example, the number of selectors which select data has to be as small as possible.

Consider the AES ShiftRows/InvShiftRows and SubBytes/InvSubBytes operations.

The ShiftRows and InvShiftRows operations have a different data arrangement order. In the arrangement example of FIG. 10 or 11, the selector 109 switches data between the encryption and the decryption.

In each of the arrangement examples in FIGS. 8, 9, 10, and 11, the ShiftRows/InvShiftRows operation is separated into the ShiftRows operation and the InvShiftRows operation. The ShiftRows operation output and the InvSubBytes operation output are connected to the subsequent SubBytes operation input and the subsequent InvSubBytes operation input, respectively, thereby omitting the selector 109.

Figure 12:
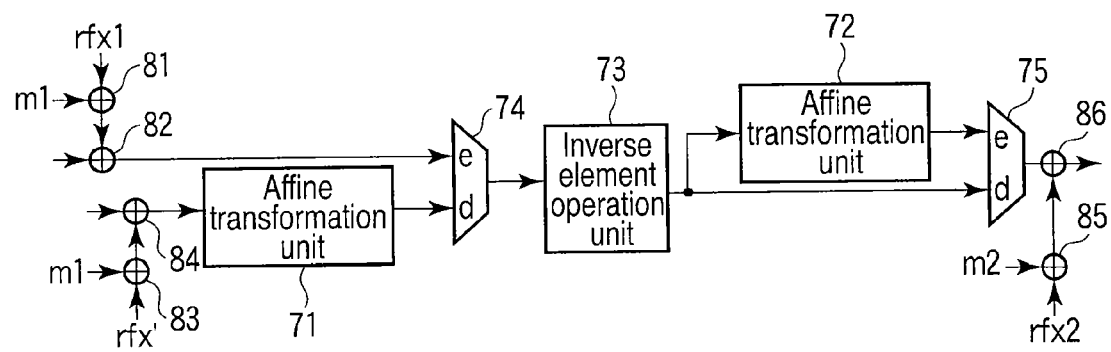
FIG. 12 is a block diagram showing still another example of the operation unit according to the embodiment.

FIG. 12 shows an arrangement example of an operation unit in which the SubBytes and InvSubBytes operation units implemented with the side channel countermeasure are integrated. Note that points different from the arrangement example in FIG. 5 will be mainly described.

Referring to FIG. 12, reference numeral 71 denotes an Affine transformation unit (first linear operation unit) which performs the Affine transform in decryption; 72, an Affine transformation unit (second linear operation unit) which performs the Affine transform in encryption; and 73, an inverse operation unit (nonlinear operation unit) which performs inverse operation on $GF(2^8)$ in both the decryption and the encryption. Reference numerals 74 and 75 denote selectors (first selection unit and second selection unit) which switch between the decryption and the encryption; and 81 to 86, XOR operation units which performs exclusive OR operations (first mask-conversion units 81 and 82, third mask-conversion units 83 and 84, and second mask-conversion units 85 and 86).

In the arrangement example in FIG. 12, unlike the arrangement of FIG. 5, the input sides, i.e., the SubBytes operation input (encryption input) and the InvSubBytes operation input (decryption input) are different lines.

An example of the operation sequence in the encryption of the operation unit in FIG. 12 is basically the same as in FIG. 6.

First of all, the selectors 74 and 75 are switched to the encryption side (step S21).

The input masked data is mask-converted from the temporary mask data m1 into the fixed mask data rfx2 (step S22).

The inverse operation unit 73 performs the inverse operation for the masked data (step S23). Note that when the masked data is mask-converted with the fixed mask data before and after the inverse operation, the masked data mask-converted with the fixed mask data is obtained as the inverse operation result. In this case, the masked data is mask-converted from rfx1 into rfx2.

The Affine transformation unit 72 performs the Affine transform (step S24). Since the fixed mask data is invariable in the Affine transform, mask-converting the data with the fixed mask data is unnecessary.

The mask data output from the Affine transformation unit 72 is mask-converted from the fixed mask data rfx2 into the temporary mask data m2. The data masked with the mask data m2 is output (step S25).

An example of an operation sequence in decryption of the operation unit in FIG. 12 is basically the same as in FIG. 7.

First of all, the selectors 74 and 75 are switched into the decryption side (step S31).

The input masked data is mask-converted from the temporary mask data m3 into the fixed mask data rfx1 (step S32). In this case, the masked data is mask-converted into rfx' to be described later in place of rfx1.

The Affine transformation unit 71 performs the Affine transform (step S33). Note that since the fixed mask data rfx' is Affine-transformed into the same value as the fixed mask data rfx1 used in the encryption, mask-converting the data with the fixed mask data is unnecessary.

The inverse operation unit 73 performs the inverse operation for the masked data (step S34). Note that when mask-converting the data between the fixed mask data is performed before and after the inverse operation as described above, the masked data mask-converted with the fixed mask data is obtained as the inverse operation result. In this case, the masked data is mask-converted from rfx1 into rfx2.

The masked data output from the inverse operation unit 73 is mask-converted from the fixed mask data rfx2 into the temporary mask data m4. The data masked with the mask data m4 is output (step S35).

The encryption will be described next.

The SubBytes operation input in FIG. 12 is d1 xor m1 in the same manner as other examples.

The XOR operation unit 81 outputs m1 xor rfx1 in the same manner as other examples.

The XOR operation unit 82 supplies d1 xor rfx1 to the inverse operation unit 73 in the same manner as other examples.

The subsequent operations are the same as in the example of FIG. 5. Finally, Affine(d1$^{-1}$) xor m2 is output.

The decryption will be described below.

The InvSubBytes operation input in FIG. 12 is d2 xor m3 in the same manner as other examples.

The XOR operation unit 83 inputs the temporary mask data m3 and the fixed mask data (in this case, rfx') and outputs their exclusive OR result m3 xor rfx'. The output rfx' will be described later.

The XOR operation unit 84 receives the above input d2 xor m3 and the output m1 xor rfx' of the XOR operation unit 83 and outputs their exclusive OR result (d2 xor m3) xor (m3 xor rfx')=d2 xor rfx'.

The Affine transformation unit 11 receives the output d2 xor rfx' of the XOR operation unit 84 and outputs its Affine transform result Affine(d2 xor rfx')=Affine(d2) xor Affine (rfx') to the inverse operation unit 73. As will be described later, Affine(d2) xor Affine(rfx')=Affine(d2) xor rfx1.

The subsequent operation is the same as in the example of FIG. 5. Finally (Affine(d2))$^{-1}$ xor m4 is output.

The fixed mask data rfx' will be described below.

In the encryption system shown in FIG. 12, like the example of FIG. 5, a value invariable in the Affine transform (Affine transforms in the Affine transformation units 11, 51, and 71), i.e., a value which satisfies rfx1=Affine(rfx1) is employed as rfx1.

To the contrary, in the decryption system in FIG. 12, a value satisfying equation (7) can be implemented. That is, rfx' is a value by which each Affine transform (Affine transforms in the Affine transformation units 11, 51, and 71) gives rfx1 in the encryption transform. Note that in this case, it is important for the side channel attack countermeasure that the rfx' Hamming weight and the rfx1 Hamming weight are the same.

$$rfx1 = \text{Affine}(rfx') \qquad (7)$$

In this case, as described above, the output from the Affine transformation unit 11 is given as Affine(d2) xor Affine(rfx')= Affine(d2) xor rfx1.

Note that rfx1 in the encryption need not be invariable in the Affine transform in the Affine transformation unit 11 (however, rfx1 may be invariable).

When rfx1 in the encryption is invariable in the Affine transform in the Affine transformation unit 11, the same value as rfx1 may be used as rfx'.

Note that the second fixed mask data may not be invariable in the Affine transform in FIG. 12. In this case, the same arrangement as in the XOR operation unit 24 in FIG. 1 is employed.

FIG. 13 shows an arrangement example of a cryptographic operation apparatus using the SubBytes/InvSubBytes operation unit shown in FIG. 12.

Referring to FIG. 13, a part 220 is the SubBytes/InvSubBytes operation unit shown in FIG. 12. Note that the XOR operation unit 81, the XOR operation unit 83, and the XOR operation unit 85 are not shown in FIG. 13.

As compared with FIG. 8, the ShiftRows/InvShiftRows operation unit 108 is replaced with a ShiftRows operation unit 208 and an InvShiftRows operation unit 209, and the selector 109 is omitted. Note that the remaining components can be basically the same as those of the conventional apparatus.

Referring to FIG. 13, since the exclusive OR operation unit 84 is inserted in the decryption data path, the logic circuit slightly increases. However, the critical path is shortened because the number of selectors is smaller than that of FIG. 8. In FIG. 8, the exclusive OR operation unit 62 in the SubBytes/InvSubBytes operation unit 120 in FIG. 8 performs mask-conversion. For this reason, even if the exclusive OR operation unit 84 is added to the decryption data path in the SubBytes/InvSubBytes operation unit 220 in FIG. 12, the maximum delay time remains unchanged. The maximum delay time can be shortened by the decrease in the number of selector as a whole. The processing capability of the cryptographic operation circuit can improve, as compared with FIG. 8.

The arrangement example in FIG. 13 is a modification of the arrangement example described with reference to FIG. 8. The arrangement examples in FIGS. 9 to 11 can be similarly modified.

Even in this case, the same mask data is used every four bytes to eliminate the mask data MixColumns/InvMixColumns operation unit.

The number of 0s may be equal (or almost equal) to the number of is in the mask data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cryptographic processing apparatus for performing an encryption and a decryption each including a nonlinear operation and a linear operation, comprising:
   a first mask-conversion circuit configured to input first data obtained by masking an operation target data with first temporary mask data, mask-convert the first data from the first temporary mask data into first fixed mask data as an invariable value in a first linear operation, and output second data obtained by masking the operation target data with the first fixed mask data;
   a first linear operation circuit configured to receive the second data, perform the first linear operation on the second data, and output third data obtained by masking, with the first fixed mask data, first result data as a result of performing the first linear operation on the operation target data;
   a nonlinear operation circuit configured to, in an encryption, receive the second data, perform a nonlinear operation on the second data, and output fourth data obtained by masking, with second fixed mask data as an invariable value in a second linear operation, a result obtained by performing the nonlinear operation on the operation target data, and in a decryption, receive the third data, perform the nonlinear operation on the third data, and output fifth data obtained by masking, with the second fixed mask data, second result data as a result of performing the nonlinear operation on the first result data;
   a second linear operation circuit configured to receive the fourth data or the fifth data, perform the second linear operation on the fourth data or the fifth data, and output sixth data obtained by masking, with the second fixed mask data, fourth result data as a result of performing the second linear operation on third result data as a result of the nonlinear operation; and
   a second mask-conversion circuit configured to, in an encryption, receive the sixth data, mask-convert the sixth data from the second fixed mask data into second temporary mask data, and output seventh data obtained by masking the fourth result data with the second temporary mask data, and in a decryption, receive the fifth data, mask-convert the fifth data from the second fixed mask data into the second temporary mask data, and output eighth data obtained by masking the second result data with the second temporary mask data.

2. The cryptographic processing apparatus of claim 1, further comprising:
   a third mask-conversion circuit configured to receive the first data, mask-convert the first data from the first temporary mask data into third fixed mask data which gives the first fixed mask data when the first linear operation unit performs the first linear operation, and output ninth data obtained by masking the operation target data with the third fixed mask data,
   wherein in a decryption, the first linear operation circuit receives the ninth data, perform the first linear operation on the ninth data, and output the third data.

3. The cryptographic processing apparatus of claim 1, wherein the number of 0s is equal or substantially equal to the number of 1s in at least one of the first temporary mask data and the second temporary mask data.

4. The cryptographic processing apparatus of claim 3, wherein the number of 0s is equal or substantially equal to the number of 1s in at least one of the first fixed mask data and the second fixed mask data.

5. The cryptographic processing apparatus of claim 4, further comprising:
   a mask data generator configured to independently generate the first temporary mask data and the second temporary mask data.

6. The cryptographic processing apparatus of claim 4, wherein the second temporary mask data is set identical to the first temporary mask data; and
   the cryptographic processing apparatus further comprises a mask data generator configured to generate the first temporary mask data.

7. The cryptographic processing apparatus of claim 6, wherein the first fixed mask data and the second fixed mask data are set independently of each other.

8. The cryptographic processing apparatus of claim 6, wherein the second fixed mask data is set identical to the first fixed mask data.

9. The cryptographic processing apparatus of claim 8, wherein the nonlinear operation circuit is configured using a table prepared in advance in correspondence with the first fixed masked data and the second fixed mask data.

10. A cryptographic processing apparatus for performing an encryption and a decryption each including a nonlinear operation and a linear operation, comprising a processor programmed to cause:
    a first mask-conversion circuit to input first data obtained by masking an operation target data with first temporary mask data, mask-convert the first data from the first temporary mask data into first fixed mask data as an invariable value in a first linear operation, and output second data obtained by masking the operation target data with the first fixed mask data;
    a first linear operation circuit to receive the second data, perform the first linear operation on the second data, and output third data obtained by masking, with the first fixed mask data, first result data as a result of performing the first linear operation on the operation target data;
    a nonlinear operation circuit to, in an encryption, receive the second data, perform a nonlinear operation on the second data, and output fourth data obtained by masking, with second fixed mask data as an invariable value in a second linear operation, a result obtained by performing the nonlinear operation on the operation target data, and in a decryption, receive the third data, perform the nonlinear operation on the third data, and output fifth data obtained by masking, with the second fixed mask data, second result data as a result of performing the nonlinear operation on the first result data;

a second linear operation circuit to receive the fourth data or the fifth data, perform the second linear operation on the fourth data or the fifth data, and output sixth data obtained by masking, with the second fixed mask data, fourth result data as a result of performing the second linear operation on third result data as a result of the nonlinear operation; and a second mask-conversion circuit to, in an encryption, receive the sixth data, mask-convert the sixth data from the second fixed mask data into second temporary mask data, and output seventh data obtained by masking the fourth result data with the second temporary mask data, and in a decryption, receive the fifth data, mask-convert the fifth data from the second fixed mask data into the second temporary mask data, and output eighth data obtained by masking the second result data with the second temporary mask data.

* * * * *